May 14, 1963  J. PICKLES  3,089,676
POWER SEAT ADJUSTER
Filed Sept. 6, 1960  3 Sheets-Sheet 1
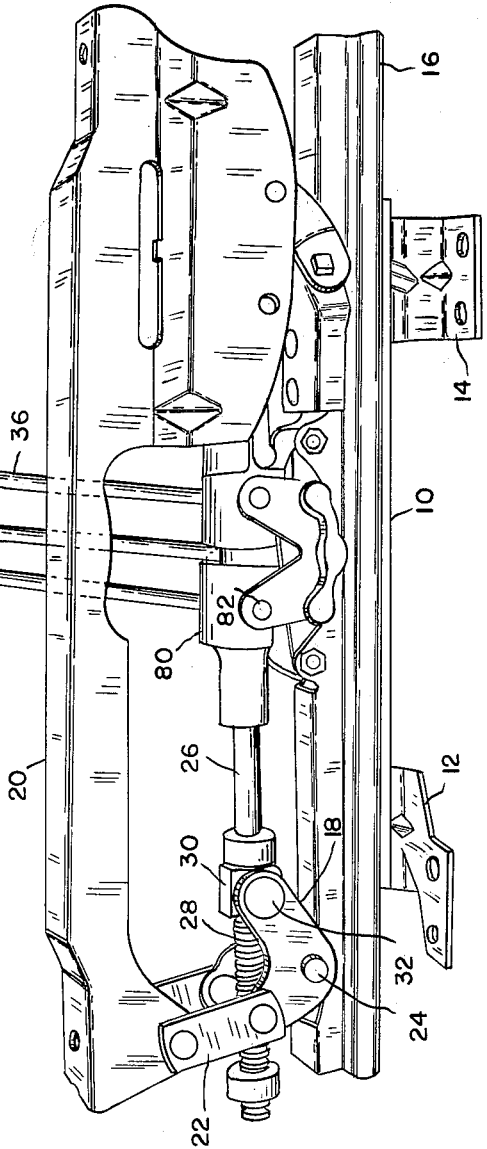
INVENTOR.
JOSEPH PICKLES
BY
ATTORNEYS May 14, 1963 J. PICKLES 3,089,676
POWER SEAT ADJUSTER
Filed Sept. 6, 1960 3 Sheets-Sheet 2
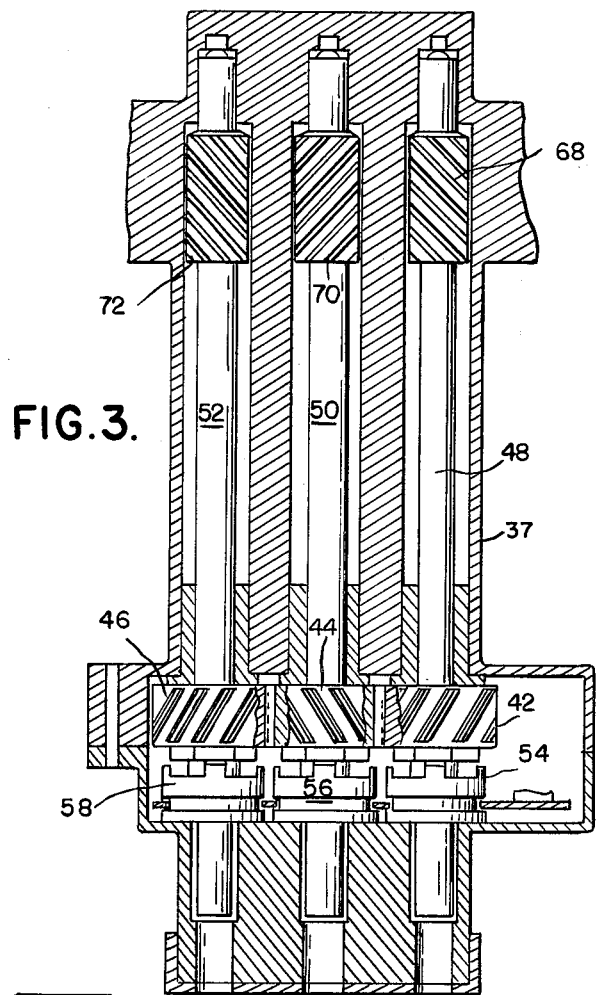
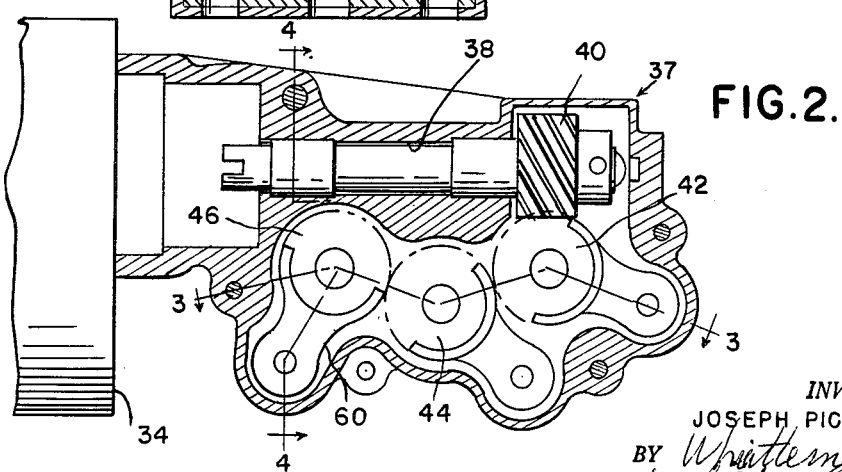
INVENTOR.
JOSEPH PICKLES
BY Whittemore,
Hulbert & Belknap
ATTORNEYS May 14, 1963  J. PICKLES  3,089,676
POWER SEAT ADJUSTER
Filed Sept. 6, 1960  3 Sheets-Sheet 3

INVENTOR.
JOSEPH PICKLES
BY Whittemore,
Hulbert & Belknap
ATTORNEYS

United States Patent Office 3,089,676
Patented May 14, 1963

3,089,676
POWER SEAT ADJUSTER
Joseph Pickles, Dearborn, Mich., assignor to Ferro Stamping Company, Dearborn, Mich., a corporation of Michigan
Filed Sept. 6, 1960, Ser. No. 53,995
6 Claims. (Cl. 248—394)

The present invention relates to a power seat adjuster, and more particularly to the drive mechanism associated therewith for transmitting power selectively from a single electric motor to a plurality of pairs of separated actuating devices.

It is an object of the present invention to provide power transmission mechanism as for example to the adjusting means of an adjustable seat support including a motor, a rotatable member driven by the motor, a flexible cable connected to the rotatable member, and a second rotatable member connected to the cable, said rotatable members being connected to like actuating devices for simultaneous actuation thereof.

More specifically, it is an object of the present invention to provide a reversible electric motor, a driving gear connected to the motor, a plurality of pairs of separated like actuating devices each of which includes a rotatable driven element, and means including flexible drive shafts for selectively coupling said driving gear to both rotatable drive elements of each pair of actuating devices.

More specifically, it is an object of the present invention to provide actuating structure which includes a support, a driving worm carried by said support, said support including pivot mounting means whose axis extends substantially perpendicular to the axis of said worm, and a worm gear mounted on said pivot mounting in mesh with said worm.

It is a further object of the present invention to provide a construction as described in the preceding paragraph which comprises a threaded shaft connected to said worm gear for rotation thereby, a nut carried by said threaded shaft, and means supporting said nut for movement longitudinally of said threaded shaft and including means effective to prevent rotation of said nut.

It is a further object of the present invention to provide drive mechanism including a housing having a plurality of parallel driving shafts therein, said housing including tubular projections in line with each of said driving shafts, a like plurality of flexible driving shafts having tubular covers through which the ends of said flexible drive shafts extend, an attaching plate fixed to the ends of said tubular covers, and releasable means for coupling said attaching plate to the ends of said tubular projections.

It is a further object of the present invention to provide a construction as described in the preceding paragraph in which the coupling means comprises a resilient wire end portions of which are connected to said cover plate, and in which said tubular projections have transversely extending slots into which said resilient wire extends.

It is a further object of the present invention to provide a construction as described in the preceding paragraph in which the tubular projections are in alignment, and in which the slots in said tubular projections are at opposite sides of adjacent projections.

Other objects and features of the invention will become apparent as the description proceeds, especially when taken in conjunction with the accompanying drawings, illustrating a preferred embodiment of the invention, wherein:

FIGURE 1 is a fragmentary perspective view of seat supporting and adjusting mechanism.

FIGURE 2 is a side elevational view partly in section, of a drive motor and drive mechanism associated therewith.

FIGURE 3 is a fragmentary sectional view on the line 3—3, FIGURE 2.

FIGURE 9 is a fragmentary end view of the rail and slide assembly.

Figure 4:
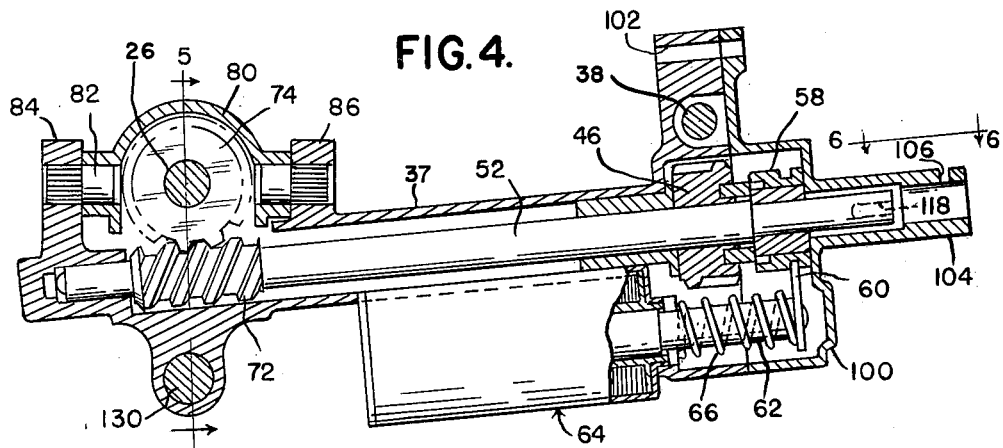
FIGURE 4 is a fragmentary sectional view on the line 4—4, FIGURE 2.

The present invention is capable of application to many different types of power devices, but for simplicity and ready understanding it has been illustrated and described in conjunction with a power seat adjusting device for an automotive vehicle. Among other possible uses which will readily occur to those skilled in the art are the connection of power mechanism to window regulators, means for actuating convertible vehicle tops, means for controlling opening and closing movement of trunk lids, and the like.

Referring first to FIGURE 1, the seat adjusting apparatus comprises a pair of substantially identical seat supporting and adjusting mechanisms, one of which is positioned at each end of a vehicle seat. Since these mechanisms are substantially identical only one will be described, and this only in sufficiently general terms to permit understanding of the power mechanism. Each of the seat adjusting mechanisms comprises a stationary rail 10 adapted to be fixedly mounted on the floor of the vehicle by suitable feet or brackets 12 and 14.

Mounted for longitudinal movement on the rail 10 is a slide 16 on which are pivotally secured front and rear bell crank levers, the front lever clearly appearing at 18. These levers are connected to the adjustable seat support bar 20, the lever 18 being illustrated as connected thereto by links 22 which prevent binding if vertical adjustment is imparted to one end of the seat supporting bar.

The power means for effecting adjustment of the seat comprises rotary threaded shafts in association with traveling nuts which are connected to relatively movable parts of the seat adjusting devices and which are retained thereby against rotation.

In the particular seat adjusting structure shown in FIGURE 1, which is known as a six-way seat support, the seat support bar 20 is movable horizontally and as a result of movement of the slide 16 on the rail 10. The forward end of the seat support bar may be raised or lowered by rocking movement of the bell crank 18 about a pivot support 24. Corresponding adjustment of the rear end of the seat support bar may be accomplished by similar mechanism (not shown). The means for actuating the bell cranks and for effecting horizontal movement of the slide 16 on the rail 10 each comprises a rotary shaft 26 having a threaded portion 28 on which is threaded a nut 30, the nut being connected to a part of the adjustment devices. For example, the nut 30 shown in FIGURE 1 is connected to the bell crank 18 by pivot mounting means 32 which are effective to prevent rotation of the nut. It will be observed that when the shaft 26 is rotated the nut is caused to move longitudinally of the shaft, thus imparting rocking motion to the bell crank 18 with a corresponding lifting or lowering movement to the adjacent end of the seat support bar 20. The screw and nut device effective to produce longitudinal sliding movement of the slide 16 includes a threaded shaft connected to the slide 16 and a nut connected to the rail 10 and held thereon against rotation although of course the relationship between the last mentioned screw and nut could be reversed.

In general terms, the means for effecting power movement of the seat support bars 20 in unison comprises a reversible electric motor 34 having means for selectively coupling it to the actuating devices at one end of the vehicle seat and connected through flexible armored drive cables 36 to the corresponding adjusting devices at the other end of the seat.

Referring now to FIGURES 2–7 it will be observed that the motor 34 has secured thereto a housing 37 containing a shaft 38 adapted to be coupled by suitable means (not shown) to the output shaft of the motor. Keyed or otherwise secured to the shaft 38 is a driving gear 40 which is in mesh with a gear 42, the latter being in mesh with a gear 44 which in turn is in mesh with a gear 46. The gears 42, 44 and 46 are all mounted for free rotation on shafts 48, 50 and 52 respectively, and are adapted to be coupled thereto by clutches 54, 56 and 58 respectively, the clutches having teeth directed toward similar clutch teeth provided on the gears 42, 44 and 46.

Referring to FIGURE 4, the clutch 58 which serves to connect the gear 46 to shaft 52 is illustrated. The clutch is keyed to the shaft 52 for longitudinal movement thereon and is adapted to be shifted into and out of clutching relationship by a shifter fork 60 carried by a plunger 62 of a solenoid 64. The shifter fork 60 is maintained in the unclutching position by a compression spring 66. It will of course be appreciated that each of the clutches 54, 56 and 58 is similarly connected to a separate solenoid.

At the opposite ends of the shafts 48, 50 and 52 are driving worms 68, 70 and 72 respectively, and these worms each connects to a worm gear. As best seen in FIGURE 4, the worm 72 is shown in mesh with a worm gear 74 keyed or otherwise secured to one of the shafts 26 previously described, and which is provided with the threaded section a portion of which is shown at 28 in FIGURE 5.

Figure 5:
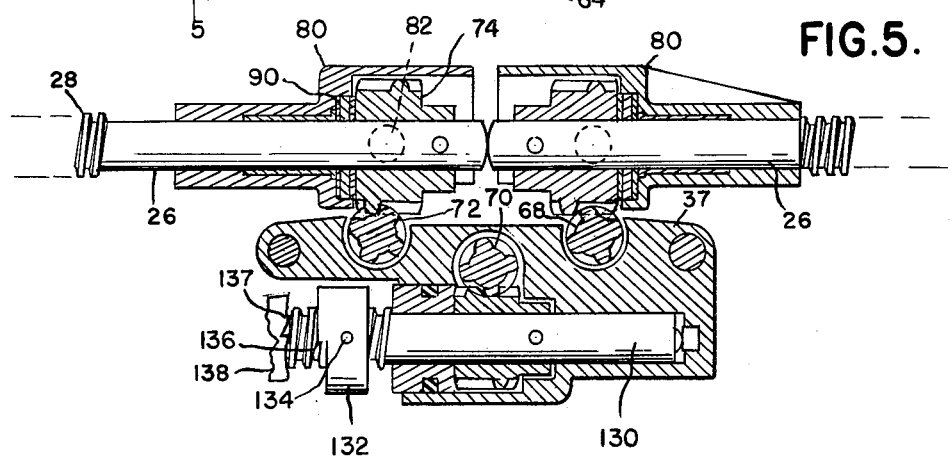
FIGURE 5 is a fragmentary sectional view on the line 5—5, FIGURE 4.

As previously stated, the threaded shafts such as the shaft 26, are subjected to rather heavy longitudinal loading and hence, these shafts require adequate support. As best seen in FIGURES 4 and 5, the shaft 26 is pinned to the worm gear 74 and is mounted in a housing 80 which in turn is trunnioned by pins 82 to ears 84 and 86 on a support housing 37. Each of the housings 80 is provided with a thrust bearing 90 engageable by the ends of the associated worm gear 74. With the foregoing construction it will be observed that the shafts 26 and the worm gears 74 connected thereto are strongly supported by the trunnion pins 82 for limited rocking movement about axes extending perpendicular to and intersecting the longitudinal axes of the shafts 26.

This limited rocking movement about the axes of the trunnion pins 82 is of course required because of the enforced arcuate travel of the nut 30. It has been found that no particular modification of the teeth of the gears 74 is required, normal backlash being sufficient to permit the required rocking movement while maintained in meshed relation with the associated driving worms 72.

The foregoing construction has been limited primarily to a description of the driving connections between the motor 34 and the actuating means associated with the adjacent seat supporting and adjusting device. The similar seat adjusting and supporting device located at the opposite end of the seat is substantially identical in its operation, but its shafts corresponding to shafts 48, 50 and 52 are connected to shafts 48, 50 and 52 in housing 37 through the armored flexible drive cables 36. Hence, parts corresponding to gears 40, 42, 44 and 46 and clutches 54, 56 and 58 are omitted in the mechanism connected to motor 34 through cables 36.

Figure 6:
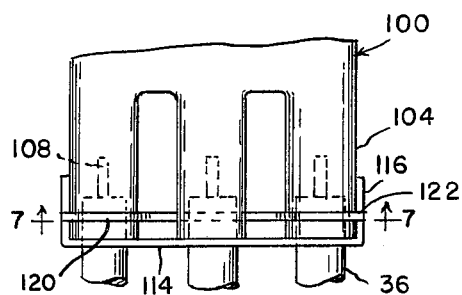
FIGURE 6 is a fragmentary plan view of a portion of the housing looking in the direction of the arrows 6—6, FIGURE 4.
Figure 7:
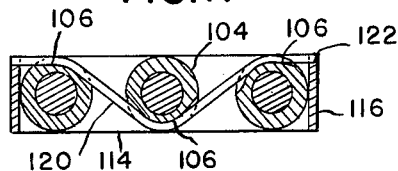
FIGURE 7 is a sectional view on the line 7—7, FIGURE 6.

Reference is now made to FIGURES 1, 4, 6 and 7 for a description of the means for connecting the flexible drive cables to the associated drive shafts. Each of the support housings 37 in which the shafts 48, 50 and 52 are mounted, includes an end cap 100 adapted to be bolted to the housing 37 by bolts received in the openings indicated at 102. Each of the shafts, of which 52 is clearly illustrated in FIGURE 4, includes an end portion extending into a tubular extension 104 of the end cap. The tubular extension includes a transversely extending slot 106. As best illustrated in FIGURES 6 and 7, the tubular extensions 104 are substantially in line and the slots 106 are provided at the tops of the two outside tubular extensions and at the bottom of the intermediate tubular extension.

Figure 8:
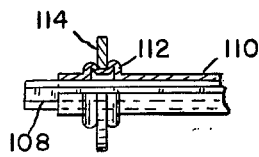
FIGURE 8 is a fragmentary end view of a portion of a flexible armored drive cable and attaching plate shown in section.

As best seen in FIGURE 8 each of the armored cables includes a flexible drive cable including a square end 108 which extends beyond the flexible armored tube 110. The armored tube adjacent its end is swaged as indicated at 112, to a mounting plate 114 having transversely bent ears 116. It will be understood that each of the drive shafts, such as the shaft 52, is provided with a squared or non-circular recess 118 as indicated in FIGURE 4, adapted to receive the squared end portion of the flexible drive cable.

With the foregoing description the manner of attaching the ends of the flexible drive cables to the housings 37 at ends of the seat will be apparent. The plate 114 is moved to insert the ends of the armored tubes into the tubular projections 104 so as to cause the squared ends 108 of the driving shafts to extend into the corresponding recesses 118. The coupling is completed by a resilient wire spring 120 the ends of which are received in notches 122 in the ears 116 of the plate 114. Intermediate the ears the flexible wire extends into the slots 106 located at the top of the two outer tubular projections 104 and in the slot 106 located at the bottom of the intermediate tubular projection 104. With this construction the assembly of the three flexible drive shafts to the housings 37, together with the effective coupling of the shafts, is accomplished.

Referring again to FIGURE 5 it will be observed that in addition to the two threaded shafts for effecting vertical movement of the opposite ends of the seat support bars 20, the third shaft is indicated at 130 and includes an abutment 132 pinned to the shaft as indicated at 134 and provided with a radially extending abutment shoulder 136 adapted to be engaged by a corresponding abutment shoulder 137 on the nut 138 movable longitudinally of the threaded portion of the shaft 130. As the shoulder of the nut engages the shoulder 136 of the abutment, travel of the seat is terminated without the possibility of jamming as would occur if endwise facing surfaces of the nut and abutment were brought into engagement. Since shafts 130 are connected to housings 37, and since nuts 138 are connected to a stationary member, such as rails 10, rotation of shafts 130 move the seat supports 20 in a front to rear direction.

The foregoing construction provides a very simple means for connecting a single reversible motor to a plurality of pairs of identical adjusting means for effecting a six-way adjustment of the seat.

The drawings and the foregoing specification constitute a description of the improved power seat adjuster in such full, clear, concise and exact terms as to enable any person skilled in the art to practice the invention, the scope of which is indicated by the appended claims.

What I claim as my invention is:

1. In adjusting apparatus, a pair of relatively movable elements, a threaded shaft member connected to one of said element, a nut member on said shaft connected to the other of said elements, gear drive means including a worm gear connected to one of said members, a worm in mesh with said worm gear with its axis generally perpendicular thereto, and pivot support means for mounting said one member for pivotal movement relative to said worm, said pivot support means having its pivot axis perpendicular to the axis of rotation of said one member and intersecting said worm gear.

2. In adjusting apparatus, a pair of relatively movable elements, a rotary threaded shaft connected to one of said elements, a nut on said shaft connected to the other of said elements and retained thereon against rotation, a drive gear fixed to said shaft, a worm rotatably carried by said one element and in mesh with said drive gear, pivot mounting means connecting said shaft to said one element for limited pivotal movement relative to said one element, the axis of said pivot mounting means being perpendicular to the axis of said shaft and intermediate the ends of said drive gear.

3. In remote control adjusting apparatus, a housing having a plurality of aligned tubular extensions, a plurality of parallel shafts in said housing aligned with said extensions, selectively operable drive means connected to said shafts, a plurality of flexible drive shaft assemblies each comprising a flexible tubular sheath and a flexible drive cable in said sheath having an end extending beyond the adjacent end of said sheath, a plate having a plurality of openings through which the end portions of said flexible sheaths extend, the end portions of said sheaths being fixed to said plate and dimensioned to fit within said tubular extensions, the ends of said flexible shafts and the ends of the shafts in said housing interfitting in driving relation, and releasable means connecting said plate to said housing.

4. In remote control adjusting apparatus, a housing having a plurality of aligned tubular extensions, a plurality of parallel shafts in said housing aligned with said extensions, selectively operable drive means connected to said shafts, a plurality of flexible drive shaft assemblies each comprising a flexible tubular sheath and a flexible drive cable in said sheath having an end extending beyond the adjacent end of said sheath, a plate having a plurality of openings through which the end portions of said flexible drive shafts extend, the end portions of said sheaths being fixed to said plate, the ends of said flexible shafts and the ends of the shafts in said housing interfitting in driving relation, and releasable means connecting said plate to said tubular extensions, said releasable means comprising slots in said tubular extensions and a resilient wire connected to said plate and having intermediate portions in said slots.

5. Apparatus as defined in claim 4 in which said tubular extensions comprise three extensions disposed in parallelism, the slots therein being at the same side of the outer extensions and at the opposite side of the middle extension, and the resilient wire having its ends connected to said plate and having an intermediate portion bent to enter all of said slots.

6. Seat adjusting apparatus for a seat slidable fore and aft and having its front and rear edges independently vertically adjustable, comprising a housing having three worm shafts mounted therein for rotation on fixed axes disposed transversely of the seat, worms on said shafts, a pair of screw shafts disposed in substantial axial alignment and extending fore and aft of the seat, a worm gear on each of said screw shafts in mesh with one of said worms, a pivot mounting for each of said screw shafts providing for limited rocking movement thereof about an axis perpendicular to and intersecting the axis of the worm gear carried thereby and intermediate the ends of said worm gear, a nut on each of said screw shafts, seat height adjusting mechanism connected to said nuts and requiring limited swinging movement of said shafts upon operation of the height adjusting mechanism, a third screw shaft journalled in said housing, a third nut on said third shaft, and means for connecting said housing and third nut intermediate the seat and a stationary support to provide for fore and aft seat adjustment.

References Cited in the file of this patent
UNITED STATES PATENTS

| | | |
|---|---|---|
| 2,616,642 | Bush | Nov. 4, 1952 |
| 2,678,460 | Oishei | May 18, 1954 |
| 2,827,105 | Brundage | Mar. 18, 1958 |
| 2,886,094 | Pickles | May 12, 1959 |
| 2,919,744 | Tanaka | Jan. 5, 1960 |
| 2,927,627 | Lohr | Mar. 8, 1960 |
| 2,929,439 | Tanaka | Mar. 22, 1960 |
| 2,931,424 | Pickles | Apr. 5, 1960 |
| 2,939,513 | Leslie | June 7, 1960 |